United States Patent

[11] 3,584,560

[72] Inventor Hermann Schill
Calmbach, Black Forest, Germany

[21] Appl. No. 747,711
[22] Filed July 25, 1968
[45] Patented June 15, 1971

[73] Assignee Prontor-Werk Alfred Gauthier, G.m.b.H.
Calmbach Black Forest, Germany

[32] Priority July 29, 1967
[33] Germany
[31] P 15 97 359.8

[54] CAMERA SHUTTER WITH AN ELECTRONIC TIMING DEVICE
5 Claims, 5 Drawing Figs.

[52] U.S. Cl. 95/53, 95/11
[51] Int. Cl. G03b 9/08
[50] Field of Search 95/53, 63, 11, 10 C

[56] References Cited
UNITED STATES PATENTS
3,476,030 11/1969 Rentschler et al. 95/10 (X)

*Primary Examiner*—Samuel S. Matthews
*Assistant Examiner*—Richard L. Moses
*Attorney*—March, Gillette and Wyatt

ABSTRACT: A camera shutter with a shutter housing and an electronic timing device in the shutter housing. The housing is formed by a base and a separate cylindrical housing wall mounted on the base. The housing wall has a recess extending in a circumferential direction and a conductor plate is mounted on the housing wall in the recess. The conductor plate has components of the electronic timing device thereon.

PATENTED JUN 15 1971

3,584,560

INVENTOR
Hermann Schill
BY
March, Gillette & Wyatt
ATTORNEYS

CAMERA SHUTTER WITH AN ELECTRONIC TIMING DEVICE

The invention concerns a camera shutter with an electronic timing device accommodated in the shutter housing.

In an electronic shutter it has already been proposed for a portion of the structural components, preferably the resistors, to be accommodated in a cylindrical extension of the exposure time setting ring. The saving of space obtained by thus accommodating the resistors in the housing interior involves mechanical stresses in those electric leads which connect the resistors with the remaining parts of the electronic timing device functionally associated therewith. Since the mainly electronic components of the timing device are fixedly mounted in the shutter housing with the resistors accommodated in a relatively displaceable part thereof, the interconnecting leads are periodically subjected to bending movements.

It is an object of the present invention to avoid this disadvantage whilst maintaining the advantageous accommodation of essential components of the electronic timing device outside the shutter interior.

In this connection it is proposed for the housing to be formed of a base, with a separate cylindrical housing wall mounted thereon, the housing wall being provided with at least one elongatable recess in a peripheral direction serving to accommodate a conductor plate supporting a part of the electronic timing device.

Preferably a plate carrying the capacitors resistors and transistors is made of a coated hardboard which is curved to the peripheral shape of the housing wall and removably secured thereto by screws. This is for the purpose of facilitating repairs or replacement of one or more of the components which may develop faults in use.

In order to provide a reliable guidance of the electric connecting leads and to dispense with special holding means, the housing wall is provided with channels to receive the electric connecting leads.

It is also of advantage to make the housing wall of plastics material by injection moulding, which avoids the need for insulation between the conductor plate and the housing, and also allows the manufacturing operations to be reduced to a minimum.

To simplify the mounting of the housing wall on the base of the shutter housing, plugs may be formed on the housing wall and used to secure this part to the base.

Figure 1:
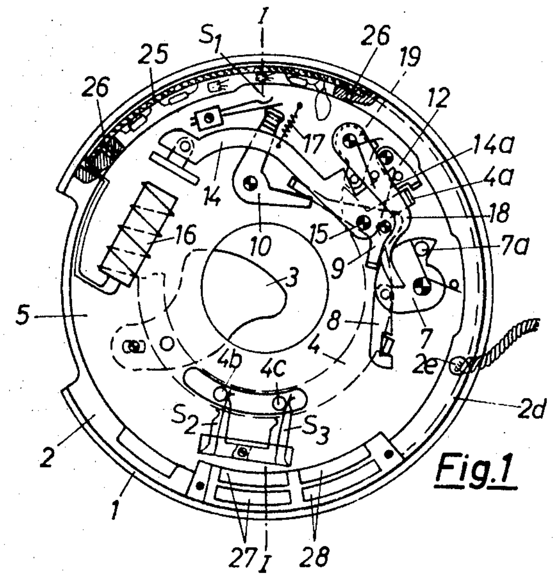
Figure 3:
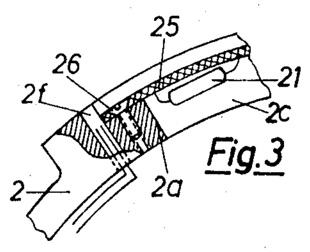
Figures 2, 4:
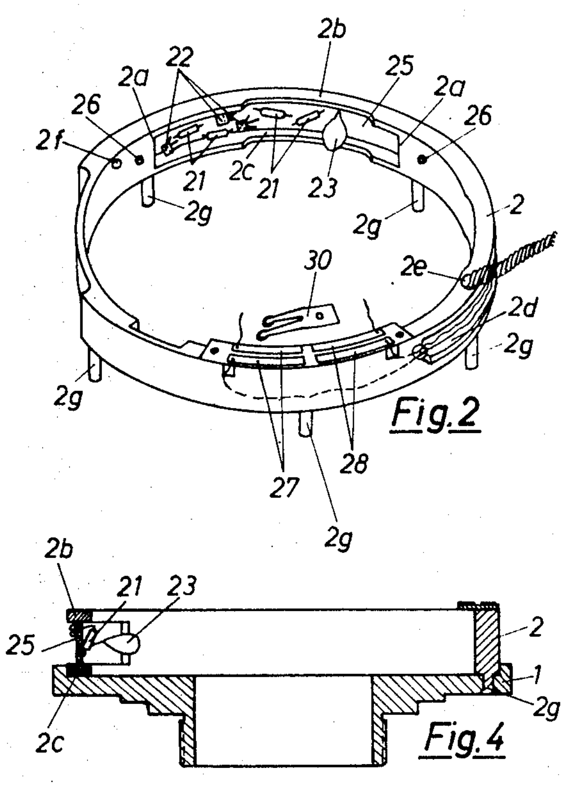
Figure 5:
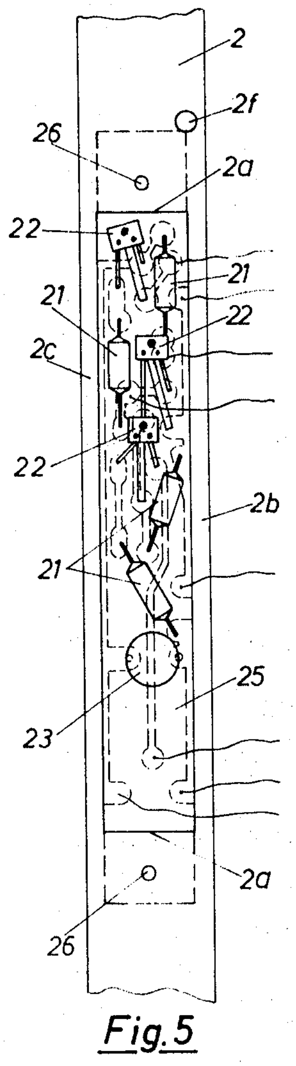

The invention is described in detail below and illustrated in the accompanying drawings, wherein:

FIG. 1 is a plan view of the shutter interior with shutter drive in the rundown state, FIG. 2 is a perspective view of the separate housing wall, FIG. 3 is a partial view on a larger scale of the housing wall, at that point at which the conductor plate abuts at one end, FIG. 4 is a cross section through the shutter housing on the line I–I of FIG. 1 and finally, FIG. 5 is a view on a larger scale of the conductor plate built into the housing wall.

Numeral 1 in the drawing denotes the base of a shutter housing, on which a cylindrical wall 2 made as a separate component is mounted. Over the housing base 1 there is a shutter baseplate 5 shown only in FIG. 1 which carries the shutter driving mechanism and located above the base with sufficient spacing to accommodate the shutter segments 3 and the segment ring 4. The driving mechanism shown has a crank drive and comprises a spring-activated driving disc 7, a thrust pawl 8 journaled thereto and the segment ring 4 engaging therewith. In the cocked position, now shown, the driving disc 7 is arrested by a two-armed release lever 9 which by means of an actuating lever 10 is adapted to be moved out of the stop position. When this occurs, the spring-activated driving disc 7 runs off in a clockwise direction, whereby the segment ring 4 and also the shutter segments execute a reciprocating movement.

The shutter driving mechanism has associated therewith an electronically controlled timing device which includes an electromechanical open-time stop. The latter has a trapping lever 12 mounted on the baseplate 5, which lever at the end of the opening movement of the segment ring 4 assumes a position at the end face in front of the arm 4*a* under spring action and thereby locks the shutter drive for a predetermined period. One completion of the exposure time the trapping lever 12 is moved by the cam 14*a* of an armature lever 14 out of the stop position, whereupon the segment ring 4 can continue its return movement and transfer the segments 3 into the closed position. The armature lever 14 is mounted on a pin 15 and cooperates with the electromagnet 16 of the electronic timing device. During the cocking operation the armature lever 14 is pressed against the action of a return spring 17 against the electromagnet 16, for which purpose a pivotally mounted pressure lever 18 is provided. The latter during the transfer of the driving disc 7 into the cocked position is swung clockwise by means of an engaging pin 7*a* mounted on the driving disc, a stalling pawl 19 positively connected with the pressure lever 18 leading the armature lever 14 towards the electromagnet 16.

To control the electromagnet 16 associated with the electronic timing device a known transistorized or tripping circuit is built in, comprising resistors 21, transistors 22 and one or more capacitors 23. In order to relieve the installation space in the shutter housing which is limited in any case, as shown especially by FIG. 2, a recess 2*a*, extending in a peripheral direction is machined therein. The recess formed in the housing wall 2 by this aperture 2*a* serves to receive the aforesaid electronic components. These, for reasons of a ready assembly, are mounted on a conductor plate 25 which is secured at both ends of the recess 2*a* with screws 26 to the housing wall 2. As shown in FIG. 2, the housing wall 2 in the region of the recess 2*a* is so formed that the electronic components 21 to 23 assume a position between the two edges 2*b* and 2*c* of the housing wall.

The conductor plate 25 is conveniently made of coated hardboard which is bent to the circumferential shape of the housing wall 2. To interconnect the electronic components 21 to 23 arranged on the conductor plate 25 the hardboard may be made as a printed circuit. The interconnection of the electronic components may also be effected conventionally by means of wires.

The housing wall is preferably made of plastics material which is an electric nonconductor, and enables the housing wall to be made by injection moulding. Also by using suitable plastics material the housing wall 2 has a rigid yet resilient form imparted thereto. As shown by FIGS. 1 and 2 the housing wall 2 is provided with channels serving to receive electric connecting leads. One of these channels extends in a peripheral direction of the housing wall 2 and is denoted in the drawing by 2*d*. In this channel the leads are disposed which are connected to contact plates 27 and 28 secured in the housing wall 2, which plates in turn cooperate with a contact slider 30 displaceable by means of a setting member, such as a time setting member, not shown, thus allowing a photoelectric resistor or a fixed resistor to be connected into the circuit of the electronic timing device. A further channel 2*e* provided in the housing wall 2 extends in an axially parallel direction and receives all the other conductors to the electronic components, formed as a cable, arranged on the housing wall. This cable includes the connecting leads of the electromagnet 16 which in accordance with the illustration in FIG. 3 are led in a radially extending channel 2*f*. Finally, the cable in the channel 2*e* may also include connecting leads to several switches associated with the electronic timing device, of which switches the switch denoted by $S_1$ is adapted to be actuated by the lever 10 and has the function of an "on" switch, whilst the switches $S_2$ and $S_3$ are formed as changeover switches and are actuated by means of a pin 4*b* or 4*c* of the segment ring 4. A photoelectric resistor connected to an exposure meter in the inoperative position of the shutter drive, can be changed over by switch $S_2$ to the electronic time control circuit by movement of the segment ring 4. The changeover switch S serves as a charge start contact for the electronic timing circuit and simultaneously acts as a parallel connection to the "on" switch $S_1$.

To secure the housing wall 2 on the base 1 of the shutter, screws or bolts may be used. It is, however, also possible for several lugs 2*g* extending in an axially parallel direction to be provided, which fit into suitable bores of the base. After joining together the wall 2 and base 1 these lugs 2*g* may be welded to the base at their free ends, providing a simple and low cost connection between wall and base. To secure the wall 2 on the base 1 the lugs 2*g* may also be replaced by plastics material rivets.

I claim:

1. A camera shutter including a shutter housing, an electronic timing device disposed in said shutter housing, said housing being formed by a base and a separate cylindrical housing wall mounted on said base, said housing wall having at least one recess extending in a peripheral direction, and a conductor plate mounted on said housing wall and disposed in said recess, said conductor plate having components of said electronic timing device disposed thereon.

2. The camera shutter of claim 1, wherein said conductor plate is coated hardboard curved to the peripheral shape of said housing wall and removably secured therein by means of screws.

3. The camera shutter of claim 2 wherein said housing wall is provided with channels to receive electrical connecting leads.

4. The camera shutter of claim 3 wherein said housing wall is made of plastics material.

5. The camera shutter of claim 4 wherein lugs are formed on said housing wall serving to secure it to the base.